Dec. 16, 1924.

B. F. GEYER

SIGNAL FOR MEASURING PUMPS

Filed Jan. 28, 1924

1,519,372

2 Sheets-Sheet 1

INVENTOR.
Benjamin F. Geyer
BY
Walter A. Knight
ATTORNEY

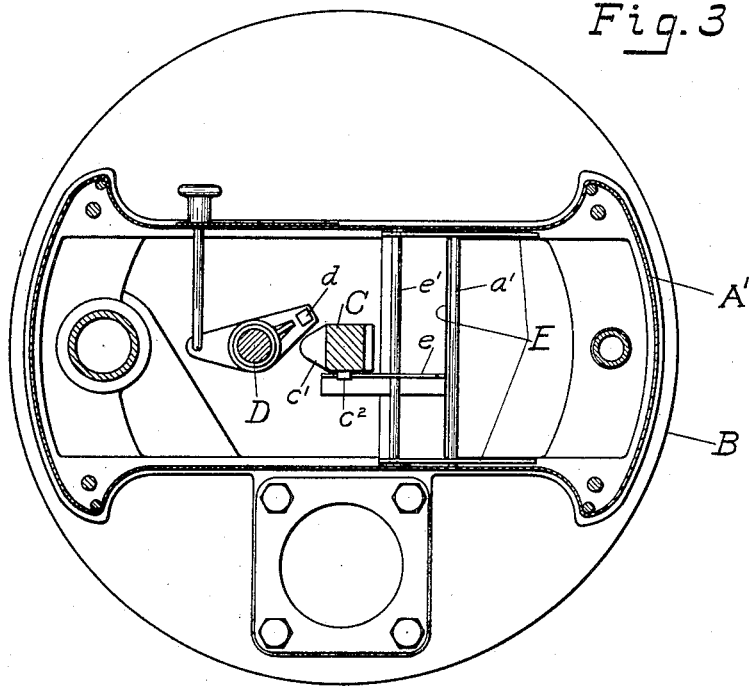

Patented Dec. 16, 1924.

1,519,372

UNITED STATES PATENT OFFICE.

BENJAMIN F. GEYER, OF FORT WAYNE, INDIANA, ASSIGNOR TO WAYNE TANK AND PUMP COMPANY, OF FORT WAYNE, INDIANA, A CORPORATION OF INDIANA.

SIGNAL FOR MEASURING PUMPS.

Application filed January 28, 1924. Serial No. 689,050.

*To all whom it may concern:*

Be it known that I, BENJAMIN F. GEYER, a citizen of the United States, residing at Fort Wayne, in the county of Allen and State of Indiana, have invented new and useful Improvements in Signals for Measuring Pumps, of which the following is a specification.

My invention relates to measuring pumps of the type generally used for dispensing gasoline, lubricating oils, kerosene and the like.

To ensure the delivery of the full quantity of liquid for which it is set, any rack-driven measuring pump in which the liquid is pumped by lifting the plunger, must start the pumping operation with the plunger at its lowest point, and the pumping operation must continue until the plunger has not only been raised to the predetermined setting but until said plunger has been returned to its lowest position. This return-stroke delivers liquid equal in volume to the displacement of the plunger rod when the full stroke it was set for has been taken. This fact is well known to purchasers from such pumps, but in enclosed pumps the position of the plunger cannot be determined by the purchaser.

My invention provides means for showing the purchaser of liquid from such pumps, when the plunger is in its lowest position. As such purchasers are frequently careless I preferably provide a signal easily seen by such purchasers from the positions usually occupied by them when making such purchases.

My invention is illustrated in the accompanying drawings, in which—

Figure 1:
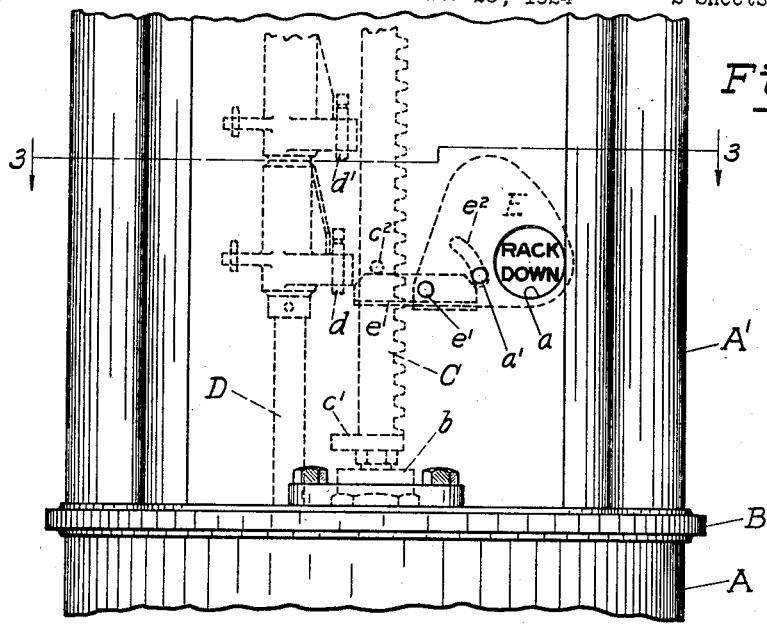

Figure 1 is a side elevation of the part of the pump casing which enclose the top of the piston rod and its rack; and shows the indicator exposed to view through a window. This position of the indicator shows that the pump plunger is in lowest position. Enclosed working parts are shown in dotted lines.

Figure 2:
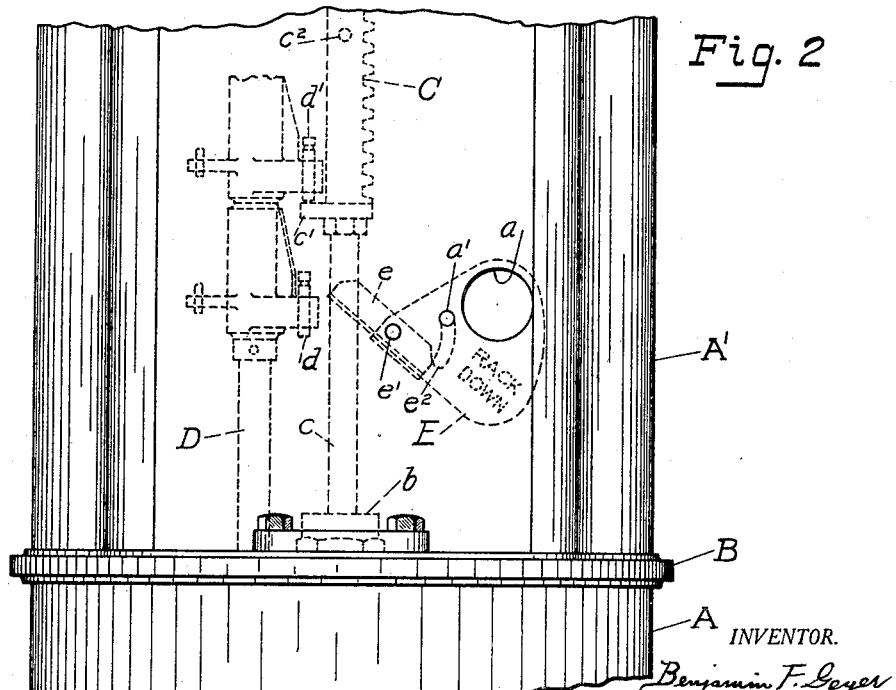

Fig. 2 is the same, with the indicator out of registry with the window. Enclosed parts in dotted lines show the rack at the end of its upward stroke, and Fig. 3 is a cross-section on the line 3—3 of Fig. 1.

Referring now to the drawings, A is the lower part of the casing, $A^1$ is the upper part and B is a flange extending from the top cylinder head, enclosed and not shown. A, which encloses the pump cylinder, is the support for flange B, and $A^1$, which is the rack casing, is seated upon said flange. Through the stuffing box $b$ the plunger rod $c$ reciprocates, and to its top is fixed the rack C which is operated in the usual manner by gear mechanism not shown. The rack carries a lug $c^1$ adapted to contact with any one of a series of stops $d$, $d^1$, mounted on the stop-rod D and adapted to be swung into and out of the path of travel of said lug $c^1$.

A stud $c^2$ is fixed to the rack C in such a manner that when the rack and plunger are nearing their lowest position said lug engages a lever $e$ which is secured to a signal arm E pivoted at $e^1$ to the casing $A^1$, and raises said arm so as to bring the signal thereon into view through the window $a$ in the casing $A^1$, as shown in Fig. 1. It will be seen that when the signal appears at the window as shown, the rack and plunger rod have reached their lowest operating position. A stud $a^1$ secured to the casing $A^1$ projects inwardly into a slot $e^2$ in the arm E and limits the downward movement of the arm.

It is very desirable that the signal should be visible from both sides of the pump, as when the apparatus is erected on the island of a filling station. I therefore prefer to make the arm E, U-shaped as shown in Fig. 3, with a pivot bar $e^1$, and a bar $a^1$ passing through both arc slots $e^2$.

I claim as my invention and desire to secure by Letters Patent of the United States:

1. In combination with a rack-driven measuring pump, in which the liquid is pumped by lifting the plunger, contact means on said rack, and means actuated by said contact means for indicating to purchasers that said rack is in its lowest position.

2. In combination with a rack-driven measuring pump, in which the liquid is pumped by lifting the plunger, a lug fixed to said rack and an arm having a signal thereon, said arm pivoted to a stationary part of the pump structure in such position as to cause the signal to be exposed to the view of the purchasers of liquid from said pump when said rack is in its lowest position by the engagement of said lug and said signal arm.

3. In combination with an enclosed rack-driven measuring pump in which the liquid is pumped by lifting the plunger, a window in said enclosing casing through which a signal may be seen from the outside of the pump, a lug fixed to said rack, an arm within said casing, a signal on one end of said arm, a lever on the other end of said arm adapted to engage said lug, said arm so proportioned and pivoted as to have the signal exposed through the window by the engagement of said lug with said lever when the rack is in its lowest position.

4. In combination with an enclosed rack-driven measuring pump in which the liquid is pumped by lifting the plunger, a lug fixed to said rack, a window on the opposite sides of said pump, a double bracket arm within said casing, a signal for each window on said arm, means on said arm for contacting with said lug, and said arm so pivoted to a stationary part of the pump apparatus as to cause said signals to register with said windows when the rack is in lowest position, by the contact of said lug and said means.

In testimony whereof I have hereunto set my hand.

BENJAMIN F. GEYER.